United States Patent
Song et al.

(10) Patent No.: US 10,843,262 B2
(45) Date of Patent: *Nov. 24, 2020

(54) COMPOSITIONS COMPRISING EUTECTIC METAL ALLOY NANOPARTICLES

(71) Applicant: XEROX CORPORATION, Norwalk, CT (US)

(72) Inventors: Guiqin Song, Milton (CA); Sarah J. Vella, Milton (CA); Barkev Keoshkerian, Thornhill (CA)

(73) Assignee: XEROX CORPORATION, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/277,545

(22) Filed: Feb. 15, 2019

(65) Prior Publication Data

US 2020/0038949 A1    Feb. 6, 2020

Related U.S. Application Data

(60) Provisional application No. 62/713,848, filed on Aug. 2, 2018.

(51) Int. Cl.
| | | |
|---|---|---|
| *B22F 1/00* | (2006.01) | |
| *B22F 9/24* | (2006.01) | |
| *C09D 11/52* | (2014.01) | |
| *C09D 11/38* | (2014.01) | |
| *B82Y 40/00* | (2011.01) | |
| *B82Y 30/00* | (2011.01) | |

(52) U.S. Cl.
CPC .......... *B22F 1/0018* (2013.01); *B22F 1/0074* (2013.01); *B22F 9/24* (2013.01); *C09D 11/38* (2013.01); *C09D 11/52* (2013.01); *B22F 2301/30* (2013.01); *B22F 2303/01* (2013.01); *B22F 2303/05* (2013.01); *B22F 2304/054* (2013.01); *B22F 2304/056* (2013.01); *B82Y 30/00* (2013.01); *B82Y 40/00* (2013.01)

(58) Field of Classification Search
None
See application file for complete search history.

(56) References Cited

U.S. PATENT DOCUMENTS

| | | | |
|---|---|---|---|
| 7,078,095 B2 | 7/2006 | Tam | |
| 7,294,358 B2 | 11/2007 | Tam | |
| 10,119,586 B2 | 11/2018 | Merlo et al. | |
| 2004/0158008 A1* | 8/2004 | He | C09J 163/00 526/72 |
| 2012/0043512 A1 | 2/2012 | Liu et al. | |
| 2012/0177930 A1* | 7/2012 | Henckens | H01B 1/22 428/414 |
| 2012/0228560 A1* | 9/2012 | Jang | C09J 9/02 252/514 |
| 2012/0312467 A1* | 12/2012 | Kleine Jaeger | C09J 11/04 156/277 |
| 2014/0290735 A1* | 10/2014 | Park | H01L 31/022425 136/256 |
| 2017/0183536 A1 | 6/2017 | Song et al. | |
| 2017/0355871 A1 | 12/2017 | Song et al. | |
| 2018/0242451 A1 | 8/2018 | Chopra et al. | |

OTHER PUBLICATIONS

Cinar, et al., Mechanical Fracturing of Core-Shell Undercooled Metal Particles for Heat-Free Soldering, Scientific Reports 2016, 6:21864.
Co-pending U.S. Appl. No. 16/277,589, entitled "Adhesive Composition Comprising Eutectic Metal Alloy Nanoparticles," filed Feb. 15, 2019.
Co-pending U.S. Appl. No. 16/277,664, entitled "Adhesive Composition Comprising Metal Nanoparticles," filed Feb. 15, 2019.
Co-pending U.S. Appl. No. 16/277,772, entitled "Conductive Adhesive Composition and Method for the Same," filed Feb. 15, 2019.
Tevis, et al., Synthesis of Liquid Core—Shell Particles and Solid Patchy Multicomponent Particles by Shearing Liquid Into Complex Particles (SLICE), Langmuir 2014, 30(47): pp. 14308-14313.

* cited by examiner

*Primary Examiner* — William D Young
(74) *Attorney, Agent, or Firm* — MH2 Technology Law Group LLP

(57) ABSTRACT

Provided herein is a composition for eutectic metal alloy nanoparticles having an average particle size ranging from about 0.5 nanometers to less than about 5000 nanometers and at least one organoamine stabilizer. Also provided herein is a process for preparing eutectic metal alloy nanoparticles comprising mixing at least one organic polar solvent, at least one organoamine stabilizer, and a eutectic metal alloy to create a mixture; sonicating the mixture at a temperature above the melting point of the eutectic metal alloy; and collecting a composition comprising a plurality of eutectic metal alloy nanoparticles having an average particle size ranging from about 0.5 nanometers to less than about 5000 nanometers. Further disclosed herein are hybrid conductive ink compositions comprising a component comprising a plurality of metal nanoparticles and a component comprising a plurality of eutectic metal alloy nanoparticles.

6 Claims, No Drawings

COMPOSITIONS COMPRISING EUTECTIC METAL ALLOY NANOPARTICLES

CROSS REFERENCE TO RELATED APPLICATIONS

This application claims the benefit of U.S. Provisional Application No. 62/713,848, filed Aug. 2, 2018, the disclosure of which is incorporated herein by reference in its entirety.

DETAILED DESCRIPTION

Field of the Disclosure

This disclosure relates generally to eutectic metal alloy nanoparticles and compositions for conductive inks comprising eutectic metal alloy nanoparticles. The eutectic metal alloy nanoparticles disclosed herein may be prepared by mixing at least one solvent, at least one organoamine stabilizer, and a eutectic metal alloy to create a mixture, and then sonicating the mixture to create a dispersion comprising eutectic metal alloy nanoparticles. Further disclosed herein is a conductive ink composition comprising a plurality of silver nanoparticles and a plurality of eutectic metal nanoparticles, wherein the eutectic metal nanoparticles have an average particle size ranging from about 0.5 nanometers to less than about 1000 nanometers.

Background

Printed electronics, or the fabrication of electronic components using liquid deposition techniques, has recently become of great interest. Such techniques may provide potentially low-cost alternatives to conventional mainstream amorphous silicon technologies for electronic applications such as thin film transistors (TFTs), light-emitting diodes (LEDs), RFID tags, photovoltaics, printed memory, and the like. However, it has been a challenge to meet the conductivity, processing, morphology, and cost requirements for practical applications of printed electronics using liquids.

Traditional processes for the fabrication of electronic circuit elements require high temperature and pressure. Accordingly, conductive elements such as interconnects are typically formed on rigid surfaces, such as silicon. High temperatures and pressures limit the use of materials available for printed electronics, which may, for example, use flexible plastic substrates that melt at low temperatures, such as at about 150° C. or less.

Certain electrically conductive materials are known in the art for low melting temperatures and thus may be suitable for use on a wide range of substrates, including flexible plastic substrates. For example, inks comprising silver nanoparticles may have a high silver content, low viscosity, and melting temperature less than or equal to about 145° C. Thus inks comprising silver nanoparticles are capable of forming conductive elements by bonding (sintering) the silver particle at low temperatures.

Despite these benefits, however, silver nanoparticle inks alone often do not provide sufficient adhesion to bond electronic components to the underlying circuitry or substrates, thus limiting their use as interconnects.

Certain liquid metals have been identified as potentially useful materials for conductive inks and for use with flexible printed electronics. These liquid metals, which may include, for example, gallium, indium, bismuth, and tin, may be added to conductive inks, such as silver nanoparticle inks, to create hybrid conductive inks. Liquid metal particles, however, due to their larger size and high density, may result in poorly dispersed compositions, as well as poor jettability of the resultant ink composition.

There is thus a need in the art for jettable ink compositions that enable printing and are suitable for fabricating interconnects as well as conductive features such as traces, electrodes, and the like on a variety of substrates, including flexible plastic substrates.

SUMMARY

Disclosed herein are eutectic metal alloy nanoparticles suitable for use in conductive inks. In one embodiment, there is provided a composition comprising a plurality of eutectic metal alloy nanoparticles having an average particle size ranging from about 0.5 nanometers to less than about 5000 nanometers, such as from about 0.5 nanometers to about 1000 nanometers or about 50 nanometers to about 800 nanometers, and at least one organoamine stabilizer. In certain embodiments, the eutectic metal alloy nanoparticles comprise Field's metal alloy, and in certain embodiments, the composition does not comprise metal nanoparticles, such as silver nanoparticles.

In certain embodiments, the composition further comprises at least one organic polar solvent, such as at least one of propylene glycol methyl ether acetate, di(propylene glycol) methyl ether acetate, (propylene glycol) methyl ether, di(propylene glycol) methyl ether, methyl isobutyl ketone, and diisobutyl ketone. In certain embodiments, the at least one organic polar solvent is propylene glycol methyl ether acetate. In various embodiments of the disclosure, the eutectic metal alloy nanoparticles have an average particle size ranging from about 50 nanometers to about 400 nanometers, such as from about 100 nanometers to about 250 nanometers. According to certain embodiments, the at least one organoamine stabilizer is chosen from butylamine, octylamine, 3-methoxypropylamine, pentaethylenehexamine, 2,2-(ethylenedioxy)diethylamine, tetraethylenepentamine, triethylenetetramine, and diethylenetriamine.

In yet another embodiment, disclosed herein are processes for preparing a composition for conductive inks, the process comprising the steps of mixing at least one organic polar solvent, at least one organoamine stabilizer, and a eutectic metal alloy to create a mixture; sonicating the mixture to create a dispersion comprising a plurality of eutectic metal alloy nanoparticles having an average particle size ranging from about 0.5 nanometers to less than about 5000 nanometers, such as from about 0.5 nanometers to less than about 1000 nanometers, from about 50 nanometers to about 800 nanometers, or from about 100 nanometers to about 500 nanometers. According to certain embodiments, the eutectic metal alloy nanoparticles comprise Field's metal alloy.

In certain embodiments of the processes disclosed herein, the at least one organic polar solvent is heated to a temperature ranging from about 50° C. to about 75° C., and in certain embodiments, the mixture is sonicated for a period of time ranging from about 1 minute to about 1 hour at 100% power. In certain embodiments, the composition is collected by centrifuging the dispersion and decanting the at least one organic polar solvent.

Further disclosed herein are hybrid conductive ink compositions comprising a component comprising a plurality of metal nanoparticles and a component comprising a plurality of eutectic metal alloy nanoparticles and at least one organoamine stabilizer, wherein the eutectic metal alloy nanoparticles have an average particle size ranging from about 0.5 nanometers to less than about 1000 nanometers, such as from about 50 nanometers to about 400 nanometers.

According to certain embodiments of the hybrid conductive ink disclosed herein, the plurality of metal nanoparticles is silver nanoparticles, and in certain embodiments, the silver nanoparticles have an average particle size ranging from about 0.5 nanometers to about 100 nanometers. In certain embodiments of the hybrid conductive ink disclosed herein, the eutectic metal alloy nanoparticle is Field's metal alloy, and in certain embodiments, the weight ratio of the eutectic metal alloy nanoparticles and the metal nanoparticles ranges from about 1:20 to about 1:5. In various embodiments disclosed herein, the hybrid conductive ink has a viscosity ranging from about 2 centipoise (cps) to about 200 cps.

It is to be understood that both the foregoing general description and the following detailed description are exemplary and explanatory only and are not restrictive of the present teachings, as claimed.

DESCRIPTION OF THE EMBODIMENTS

Reference will now be made in detail to embodiments of the present disclosure. The following description is merely exemplary.

Disclosed herein are compositions comprising eutectic metal alloy nanoparticles. As used herein, the term "eutectic" refers to a mixture or an alloy in which the constituent parts are present in such proportions that the constituents melt simultaneously, and the melting point is lower than either of the constituents individually. The term "melting point," as used herein, refers to the temperature at which a solid becomes a liquid at atmospheric pressure. The term "alloy," as used herein, refers to a mixture containing two or more metals, and, optionally, additional non-metals, wherein the elements of the alloy are fused together or dissolved into each other when molten. Accordingly, a eutectic metal alloy solidifies at a single temperature and melts completely at one temperature, the eutectic point.

In certain embodiments, the eutectic metal alloy nanoparticle compositions disclosed herein may be added to metal nanoparticles, such as silver nanoparticles, or a composition comprising metal nanoparticles, to form a hybrid conductive ink containing a plurality of silver nanoparticles and a plurality of eutectic metal alloy nanoparticles. These inks may retain electrical conductivity comparable to conventional nanosilver inks, even though they may be formulated with less silver, such as up to 20% less silver and, accordingly, can be manufactured at a reduced cost. The hybrid conductive ink compositions disclosed herein may also be suitable for use with jetting applications, including aerosol jet printing, and may be used to form self-healing conductive elements at low sintering temperatures. Accordingly, the hybrid conductive ink compositions disclosed herein are suitable for use with a variety of substrates, including low-melting point plastics. These hybrid conductive inks, unlike conventional nanosilver inks, may also be useful as a solder to form robust interconnects at low temperatures.

The nanometer size of the eutectic metal alloy nanoparticles disclosed herein, along with their ligand functionalization, may allow the eutectic metal alloy nanoparticles to be well-dispersed into jettable ink formulations. In certain embodiments, the hybrid conductive ink composition comprising eutectic metal alloy nanoparticles may have a measured conductivity greater than about 1000 S/cm, have a high adhesive strength, a curing temperature less than about 120° C., and a curing time less than about 2 hours.

The eutectic metal alloy nanoparticles disclosed herein may comprise the eutectic alloy Field's metal (bismuth, indium, and tin). In certain embodiments, the weight ratio of the eutectic metal alloy nanoparticles and the metal nanoparticles in a hybrid conductive ink may range from about 1:20 to about 1:5.

Also provided herein is a method of forming an interconnect, including: a) depositing a hybrid conductive ink on a conductive element positioned on a substrate, wherein the hybrid conductive ink includes a plurality of silver nanoparticles and a plurality of eutectic metal alloy nanoparticles; b) placing an electronic component onto the hybrid conductive ink; and c) heating the substrate, conductive element, hybrid conductive ink and electronic component to a temperature sufficient i) to anneal the plurality of silver nanoparticles in the hybrid conductive ink and ii) to melt the plurality of eutectic metal alloy nanoparticles to form a melted eutectic alloy, wherein the melted eutectic alloy flows to occupy spaces between the annealed plurality of silver nanoparticles, d) allowing the melted eutectic alloy of the hybrid conductive ink to harden and fuse to the electronic component and the conductive element, thereby forming the interconnect.

Eutectic Metal Alloys

In certain embodiments, disclosed herein are compositions comprising at least one organoamine stabilizer and a plurality of eutectic metal alloy nanoparticles. To prepare the compositions disclosed herein comprising a plurality of eutectic metal alloy nanoparticles, a suitable eutectic metal alloy may be added to at least one polar solvent and the at least one organoamine stabilizer.

Suitable eutectic metal alloys for use in the present composition include those eutectic metal alloys having a melting point lower than that of the melting point of the substrate upon which a conductive ink composition may be deposited and sintered. For example, in certain embodiments, the melting points of suitable eutectic metal alloys may be about 140° C. or less, such as about 55° C. to about 75° C., about 60° C. to about 65° C., or about 62° C. Eutectic metal alloys may be comprised of, for example, at least two metals chosen from bismuth, lead, tin, cadium, zinc, indium, gallium, and thallium. For example, the eutectic metal alloys may include at least two of bismuth, tin, indium, and gallium, or, in certain embodiments, the eutectic metal alloy disclosed herein may include indium, bismuth, and tin. In certain embodiments, the eutectic metal alloy is chosen from $In_{51.0}Bi_{32.5}Sn_{16.5}$, i.e., Field's Metal (melting point 62° C.), $Bi_{58}Sn_{42}$ (melting point 138° C.), $In_{66.3}Bi_{33.7}$ (melting point 72° C.), and $Bi_{57}Sn_{43}$ (melting point 139° C.). As used herein, "Field's metal" refers to a eutectic, low-melting alloy of bismuth, indium, and tin, that is $In_{51.0}Bi_{32.5}Sn_{16.5}$. In other embodiments disclosed herein, the eutectic metal alloy may further include at least one organic vehicle, such as an organic solvent and/or a stabilizer as described herein for the silver nanoparticle component.

Organoamine Stabilizers

In some embodiments, the component comprising a plurality of eutectic metal alloy nanoparticles further comprises at least one organic stabilizer. The organic stabilizer may be physically or chemically associated with the surface of the eutectic metal alloy nanoparticles. In this way, the nanoparticles have the stabilizer thereon outside of a liquid solution. That is, the nanoparticles with the stabilizer thereon may be isolated and recovered from a reaction mixture solution used in forming the nanoparticles and stabilizer complex. The stabilized nanoparticles may thus be subsequently ready and homogenously dispersed in a solvent for forming a hybrid conductive ink composition.

The organic stabilizer may interact with the eutectic metal alloy nanoparticle by a chemical bond and/or a physical attachment. The chemical bond may take the form of, for example, covalent bonding, hydrogen bonding, coordination complex bonding, ionic bonding, or a mixture of different chemical bonds. The physical attachment may take the form of, for example, van der Waals' forces, dipole-dipole interactions, or a mixture of different physical attachments.

The term "organic" in "organic stabilizer" refers to, for example, the presence of carbon, but, in addition to carbon, the organic stabilizer may include one or more non-metal heteroatoms such as nitrogen, oxygen, sulfur, silicon, halogen, and the like.

Exemplary organic stabilizers can include organoamines such as propylamine, butylamine, pentylamine, hexylamine, heptylamine, octylamine, nonylamine, decylamine, undecylamine, tridecylamine, tetradecylamine, pentadecylamine, hexadecylamine, heptadecylamine, octadecylamine, N,N-dimethylamine, N,N-dipropylamine, N,N-dibutylamine, N,N-dipentylamine, N,N-dihexylamine, N,N-diheptylamine, N,N-dioctylamine, N,N-dinonylamine, N,N-didecylamine, N,N-diundecylamine, N,N-didodecylamine, dodecylamine, methylpropylamine, ethylpropylamine, propylbutylamine, ethylbutylamine, ethylpentylamine, propylpentylamine, butylpentylamine, triethylamine, tripropylamine, tributylamine, tripentylamine, trihexylamine, triheptylamine, trioctylamine, 1,2-ethylenediamine, N,N,N', N'-tetramethylethylenediamine, propane-1,3-diamine, N,N, N',N'-tetramethylpropane-1,3-diamine, butane-1,4-diamine, N,N,N',N'-tetramethylbutane-1,4-diamine, diaminopentane, diaminoheptane, diaminooctane, diaminononane, diaminodecane, 2,2-(ethylenedioxy)diethylamine, 3-methoxypropylamine, pentaethylenehexamine, tetraethylenepentamine, and the like or mixtures thereof. Exemplary organoamine stabilizers include butylamine, octylamine, 2,2-(ethylenedioxy)diethylamine, 3-methoxypropyl amine, pentaethylenehexamine, and tetraethylenepentamine.

The extent of the coverage of the at least one organoamine stabilizer on the surface of the eutectic metal alloy nanoparticles may vary, for example, from partial to full coverage depending on the capability of the organoamine stabilizer to stabilize the nanoparticles.

Organic Polar Solvents

In certain embodiments, the composition comprising a plurality of eutectic metal alloy nanoparticles further comprises at least one organic polar solvent. According to various embodiments disclosed herein, the solvent is not water, and in certain embodiments, the composition comprising a plurality of eutectic metal alloy nanoparticles is free of water. As used herein, "free of water," indicates that the composition does not contain a detectable quantity of water or that the composition is anhydrous.

Exemplary suitable organic polar solvents may include propylene glycol methyl ether acetate, propylene glycol monomethyl ether acetate, toluene, di(propylene glycol) methyl ether acetate, (propylene glycol) methyl ether, di(propylene glycol) methyl ether, methyl isobutyl ketone, diisobutyl ketone, butyl acetate, methoxypropylacetate, propoxylated neopentylglycoldiacrylate, 1-phenoxy-2-propanol, and combinations thereof. In certain embodiments, the at least one polar solvent is propylene glycol methyl ether acetate.

Eutectic Metal Alloy Nanoparticles

The eutectic metal alloy nanoparticle composition disclosed herein may be prepared by any suitable method. One exemplary method is to add pieces, such as centimeter sized chunks, of the eutectic metal alloy disclosed herein to a heated mixture comprising at least one solvent and at least one organoamine stabilizer until the alloy is molten and a mixture is formed. The mixture may then be dispersed by sonication and cooled. The eutectic metal alloy nanoparticles may then be isolated by decantation, rinsed, and dried.

Prior to, during, or after mixing the at least one organoamine stabilizer to the at least one solvent, the solvent may be heated, for example, to a temperature above the melting point of the eutectic metal alloy nanoparticles. In certain embodiments, the solvent may be heated to a temperature greater than about 55° C., such as about 60° C., about 65° C., about 70° C., about 75° C., or about 80° C.

The sonication can be performed by probe sonication or by bath sonication. Probe sonication refers to sonication wherein a probe is inserted into a container containing the mixture. Bath sonication refers to sonication wherein the container containing the mixture is placed into a bath, and the bath is subsequently sonicated. Probe sonication may provide greater energy/power compared to bath sonication.

In certain embodiments, the mixture may be sonicated at any suitable power, such as a power ranging from about 20% to about 100%, such as about 50% to about 90%, about 60% to about 80%, or, in certain embodiments, at about 100% power. The mixture may be sonicated for any suitable amount of time, such as, for example, from about 1 minute to about 1 hour, or, in certain embodiments, from about 2 minutes to about 45 minutes, about 5 minutes to about 20 minutes, or about 8 minutes to about 15 minutes. Any desired or effective sonicator can be used, such as a Branson Digital Probe Sonifier®. During sonication, the dispersion may be iced in order to cool the dispersion. In certain embodiments, the dispersion may be placed in an ice bath while sonicating in order to maintain the temperature of the dispersion below a certain temperature, such as, for example, below about 100° C., below about 85° C., or below about 75° C. After sonication, the dispersion may be cooled, for example cooled to about room temperature. The dispersed nanoparticles may then be collected, for example by centrifucation and decantation of the solvent, which may be repeated as necessary. Finally, the nanoparticles may be dried.

The average diameter of the eutectic metal alloy nanoparticles may be about 1000 nanometers (nm) or less. In certain embodiments, the average particle size of the eutectic metal alloy nanoparticles may range from about 0.5 nm to about 1000 nm or from about 0.5 nm to less than about 1000 nm, such as from about 1 nm to about 750 nm, from about 10 nm to about 500 nm, from about 50 nm to about 400, from about 75 nm to about 250 nm, from about 100 nm to about 200 nm, or from about 100 nm to about 150 nm. In certain embodiments, the median diameter (D50) of the eutectic metal alloy nanoparticles may range from about 0.5 nm to about 1000 nm or from about 0.5 nm to less than about 1000 nm, such as from about 1 nm to about 750 nm, from about 10 nm to about 500 nm, from about 50 nm to about 400, from about 75 nm to about 250 nm, from about 100 nm to about 225 nm, or from about 150 nm to about 200 nm. The average particle size and diameter of the particles may be determined by any suitable means, such as, for example, light microscopy, Scanning Electron Microscopy (SEM), or, for example, by using a Nanotrac® particle size analyzer.

Hybrid Conductive Ink Compositions

The hybrid conductive inks disclosed herein may include a component comprising a plurality of eutectic metal alloy nanoparticles and a component comprising a plurality of metal nanoparticles, such as silver nanoparticles. The component comprising a plurality of metal nanoparticles contains silver nanoparticles and optionally at least one of solvents, stabilizers, and other additives.

The metal nanoparticles, such as silver nanoparticles, disclosed herein may have any shape or geometry, for example spherical. In certain embodiments, the silver nanoparticles have a volume average particle diameter ranging from about 0.5 nm to about 100 nm, such as from about 1 nm to about 50 nm, or from about 1 nm to about 20 nm. Volume average particle size may be measured by any suitable means, such as a light scattering particle sizer, a Transmission Electron Microscope or a Beckman Coulter Multisizer 3 (Beckman Coulter Inc., Life Sciences Division, Indianapolis, Ind.). In certain embodiments, volume average particle size of the present silver nanoparticles may be measured via dynamic light scattering using a Malvern Nano ZS Zetasizer Model 3600 (Malvern Instruments Ltd., Worcestershire, UK).

As used herein, the particle size distribution width refers to the difference between the diameter of the largest nanoparticle and the diameter of the smallest nanoparticle, or the range between the smallest and the largest nanoparticle. In certain embodiments, the particle size distribution width of the silver nanoparticles is about 30 nm or less, such as from about 10 nm to about 30 nm, or from about 10 nm to about 25 nm.

The silver nanoparticles disclosed herein may, in certain embodiments, have properties distinguishable from those of silver flakes. For example, the silver nanoparticles disclosed herein may be characterized by enhanced reactivity of the surface atoms and high electrical conductivity. Further, the present silver nanoparticles may have a lower melting point and a lower sintering temperature than silver flakes. The term "sintering" refers to a process in which adjacent surfaces of metal powder particles are bonded by heating, i.e., "annealed." This is in contrast to micron-sized metal flakes, where the mode of conductivity is via ohmic contact through particle-particle touching and overlap. These flake-based inks may have conductivities several orders of magnitude lower than sintered nanoparticle conductive inks that melt together.

Due to their small size, silver nanoparticles may exhibit a melting point as low as 700° C. below that of silver flakes. In some embodiments, the silver nanoparticles of the hybrid conductive inks disclosed herein may sinter at temperatures greater than 800° C. below that of bulk silver (mp=961.8° C.). In certain embodiments, the silver nanoparticles of the present disclosure sinter at a temperature ranging from about 80° C. to about 250° C., such as from about 145° C. or less, or at about 140° C. or less, such as at about 130° C. or at about 120° C.

Although not wishing to be bound by theory, it is believed that the lower melting point of the silver nanoparticles disclosed herein is a result of their comparatively high surface-area-to-volume ratio, which allows bonds to readily form between neighboring particles. The large reduction in sintering temperature for metal nanoparticles enables the formation of highly conductive circuit traces or patterns on flexible plastic substrates since such substrates, e.g., polycarbonate substrates, may melt or soften at a relatively low temperature (for example, at about 150° C.).

The silver nanoparticles disclosed herein may comprise elemental silver, a silver alloy, a silver compound or combinations thereof. In certain embodiments, the silver nanoparticles may be a base material coated or plated with pure silver, a silver alloy or a silver compound. For example, the base material may be copper nanoparticles with a silver coating.

Silver alloys of the present disclosure may be formed from at least one metal selected from Au, Cu, Ni, Co, Pd, Pt, Ti, V, Mn, Fe, Cr, Zr, Nb, Mo, W, Ru, Cd, Ta, Re, Os, Ir, Al, Ga, Ge, In, Sn, Sb, Pb, Bi, Si, As, Hg, Sm, Eu, Th, Mg, Ca, Sr, and Ba. Exemplary metal composites are Au—Ag, Ag—Cu, Au—Ag—Cu, and Au—Ag—Pd. In certain embodiments, the metal composites may further include at least one non-metal, such as, for example, Si, C, and Ge. Suitable silver compounds may include, for example, silver oxide, silver thiocyanate, silver cyanide, silver cyanate, silver carbonate, silver nitrate, silver nitrite, silver sulfate, silver phosphate, silver perchlorate, silver tetrafluoroborate, silver acetylacetonate, silver acetate, silver lactate, silver oxalate, and derivatives thereof. In certain embodiments, the silver nanoparticles comprise elemental silver.

In addition to silver nanoparticles, the silver nanoparticle component of the hybrid conductive ink composition disclosed herein may also include at least one organic vehicle. In certain embodiments, the constituents of the at least one organic vehicle may be selected by those having ordinary skill in the art, in accordance with the present disclosure for the hybrid conductive ink, to meet specific deposition, processing, adhesion and/or other performance characteristics. For instance, in an application in which the present hybrid conductive ink compositions are employed as a solder paste replacement, the organic vehicle may be formulated to volatize during processing. In applications in which the present hybrid conductive ink compositions are employed in adherent coatings on nonmetallic surfaces, the organic vehicle may be selected for adhesive properties.

In some embodiments, the organic vehicle comprises a solvent to disperse the silver nanoparticles. The solvent may be, for example, a non-polar organic solvent. Suitable non-polar organic solvents include, for example, hydrocarbons such as alkanes; alkenes; alcohols having from about 10 to about 18 carbons such as undecane, dodecane, tridecane, tetradecane, hexadecane, 1-undecanol, 2-undecanol, 3-undecanol, 4-undecanol, 5-undecanol, 6-undecanol, 1-dodecanol, 2-dodecanol, 3-dodecanol, 4-dodecanol, 5-dodecanol, 6-dodecanol, 1-tridecanol, 2-tetradecanol, 3-tetradecanol, 4-tetradecanol, 5-tetradecanol, 6-tetradecanol, 7-tetradecanol, and the like; alcohols, such as for example, terpineol (α-terpineol), β-terpineol, geraniol, cineol, cedral, linalool, 4-terpineol, lavandulol, citronellol, nerol, methol, borneol, hexanol, heptanol, cyclohexanol, 3,7-dimethylocta-2,6-dien-1-ol, and 2-(2-propyl)-5-methyl-cyclohexane-1-ol; isoparaffinic hydrocarbons such as isodecane, isododecane, and commercially available mixtures of isoparaffins such as Isopar® E, Isopar® C, Isopar® L, Isopar® V, and Isopar® M, manufactured by Exxon Chemical Company Inc. (Spring, Tex.); Shellsol®, manufactured by Shell Chemical Company (The Hague, Netherlands); Soltrol®, manufactured by Philips Oil Co., Ltd. (The Woodlands, Tex.); Begasol®, manufactured by Mobil Petroleum Co., Inc. (Spring, Tex.); IP Solvent 2835, made by Idemitsu Petrochemical Co., Ltd. (Tokyo, JP); naphthenic oils; aromatic solvents such as benzene, nitrobenzene, toluene, ortho-, meta-, and para-xylene, and mixtures thereof; 1,3,5-trimethylbenzene (mesitylene); 1,2-, 1,3-, and 1,4-dichlorobenzene, and mixtures thereof; trichlorobenzene; cyanobenzene; ethylcyclohexane, phenylcyclohexane, and tetralin; aliphatic solvents, such as hexane, heptane, octane, isooctane, nonane, decane, and dodecane; and cyclic aliphatic solvents, such as bicyclohexyl and decalin. In certain embodiments, two or more non-polar organic solvents may be used as dispersion agents, and in certain embodiments, the non-polar organic solvents included in the silver nanoparticle component are ethylcyclohexane and phenylcyclohexane.

The at least one non-polar organic solvent may be present in the silver nanoparticle composition in an amount, for example, ranging from about 5 weight percent to about 50 weight percent, such as from about 10 weight percent to about 40 weight percent, from about 10 weight percent to about 40 weight percent, about 36 weight percent, or from about 10 weight percent to about 26 weight percent, based on the total weight of the silver nanoparticle ink component. As a result, the weight percentage of silver nanoparticles in the silver nanoparticle ink composition may range, for example, from about 95 weight percent to about 50 weight percent, from about 90 weight percent to about 64 weight percent, from about 90 weight percent to about 74 weight percent.

In some embodiments, the at least one organic vehicle comprises at least one stabilizer. In certain embodiments, the at least one stabilizer may interact with the silver nanoparticles by chemical bond and/or a physical attachment. The chemical bond may take the form of, for example, covalent bonding, hydrogen bonding, coordination complex bonding, ionic bonding or a mixture of different chemical bondings. The physical attachment may take the form of, for example, van der Waals' forces, dipole-dipole interaction, or a mixture of different physical attachments. In addition, the at least one stabilizer may be thermally removable, which means that the at least one stabilizer may disassociate from a silver-containing nanoparticle surface under certain conditions, such as through heating or annealing.

Suitable stabilizers include at least one organic stabilizer as defined above for eutectic metal alloy nanoparticles. In certain embodiments, the silver nanoparticles are stabilized with at least one of octylamine, nonylamine, decylamine, undecylamine, dodecylamine, tridecylamine, tetradecylamine, pentadecylamine, or hexadecylamine.

The weight percentage of the at least one organic stabilizer in the silver nanoparticle component (including only the silver nanoparticles and the at least one stabilizer and excluding the at least one solvent) may range from, for example, about 3 weight percent to about 60 weight percent, from about 5 weight percent to about 35 weight percent, from about 5 weight percent to about 20 weight percent, or from about 5 weight percent to about 10 weight percent. As a result, the weight percentage of the silver in the silver nanoparticles (excluding the at least one solvent) may range from, for example, about 40 weight percent to about 97 weight percent, from about 65 weight percent to about 95 weight percent, from about 80 weight percent to about 95 weight percent, or from about 90 weight percent to about 95 weight percent.

The silver nanoparticle component may further include at least one resin to improve adhesion to substrates. For example, the silver nanoparticle component may comprise at least one resin selected from polystyrene, terpene, styrene block copolymers such as styrene-butadiene-styrene copolymer, styrene-isoprene-styrene copolymer, styrene/ethylenbutylene-styrene copolymer, and styrene-ethylene/propylene copolymer, ethylene-vinyl acetate copolymers, ethylene-vinyl acetate maleic anhydride terpolymers, ethylene butyl acrylate copolymer, ethylene-acrylic acid copolymer, polyolefins, polybutene, polyamides or the like, and mixtures thereof. In certain embodiments, the at least one resin is present in an amount ranging from about 0.05 percent to about 5 percent by weight of the total weight of the silver nanoparticle component. In certain embodiments, the at least one resin is present in an amount ranging from about 0.1 to about 3 percent by weight of the total weight of the silver nanoparticle component. In other embodiments, the resin is omitted from the silver nanoparticle component.

The silver nanoparticle component may also comprise at least one other additive such as humectants, surfactants, and bactericides/fungicides. The additives may be a small percentage with respect to the composition of the silver nanoparticle component and may be used to tune ink properties or to add specific properties as is understood by a skilled artisan. For example, at least one surfactant may be included in the silver nanoparticle component to reduce the surface tension of the silver component. Viscosity of the silver nanoparticle component may be adjusted to a desired value by including, for example, at least one polymeric thickening agent such as polyvinyl alcohol. Humectants, such as glycols, may also be added to the silver nanoparticle component, for example to control evaporation.

The silver nanoparticle component of a hybrid conductive ink as disclosed herein may be prepared by any suitable method. One exemplary method is to disperse the silver nanoparticles into at least one non-polar organic solvent and optionally at least one stabilizer under inert bubbling. The silver nanoparticle ink component may then be shaken to wet the nanoparticles and then rolled to ensure mixing. The silver nanoparticle ink may then be filtered through a glass fiber and subsequently purged with nitrogen or argon.

The hybrid conductive inks disclosed herein may be prepared by mixing the silver nanoparticle component with the eutectic metal alloy nanoparticle component. In certain embodiments, the weight ratio of the eutectic metal alloy nanoparticle component to silver nanoparticle component in the hybrid conductive ink may range from about 1:20 (w/w) to about 20:1 (w/w), such as about 1:5 (w/w), about 1:10 (w/w), about 1:15 (w/w), about 1:1 (w/w), about 5:1 (w/w), about 10:1 (w/w), or about 15:1 (w/w).

The hybrid conductive inks disclosed herein may have any desired viscosity. In certain embodiments, the viscosity ranges from about 2 cps to about 500 cps, such as from about 3 cps to about 100 cps, from about 4 cps to about 50 cps, or from about 5 cps to about 20 cps. The hybrid conductive inks disclosed herein may have any feasible cure rate. In certain embodiments, the hybrid conductive ink may cure in less than about 24 hours, such as between about 10 minutes to about 12 hours or between about 1 hour to 3 hours, such as in less than about 2 hours.

Methods of Forming Conductive Elements

The hybrid conductive inks disclosed herein may be used to fabricate a conductive element, such as conductive traces, conductive bonding pads, electrodes, interconnects, and the like.

In certain embodiments, conductive elements may be formed from the hybrid conductive inks by depositing the hybrid conductive ink onto a substrate and heating the hybrid conductive ink to form annealed silver nanoparticles and melted eutectic metal alloy, wherein the melted eutectic metal alloy occupies spaces between the annealed silver nanoparticles. In certain embodiments, the deposited hybrid conductive ink is allowed to dry prior to heating.

In certain embodiments, prior to sintering, the hybrid conductive ink may be deposited onto a substrate, such as a plastic substrate, as described herein. The mixture may then be heated to a temperature sufficient to sinter the silver nanoparticles, such as, for example, about 130° C. The deposited conductive ink may be electrically insulating or may have very low electrical conductivity. However, during the sintering process, the silver nanoparticles in the hybrid conductive ink may anneal to form a conductive element. The eutectic metal alloy nanoparticles may also participate in the process by melting and flowing between the annealed silver nanoparticles to form a conductive "weld" to the annealed silver.

As used herein, "a temperature sufficient to sinter the silver nanoparticles" is a temperature sufficient to result in attachment of the silver nanoparticles at adjacent surfaces. A temperature sufficient to sinter the silver nanoparticles may range, for example, from about 80° C. to about 250° C., such as about 145° C. or less, about 140° C. or less, about 130° C. or about 120° C.

The hybrid conductive ink compositions disclosed herein may be deposited onto a substrate or other surface, such as a connective pad, by, for example, solution depositing. Solution depositing as used herein refers to a process whereby a liquid is deposited upon a substrate to form a coating or pattern. Solution depositing includes, for example, one or more of spin coating, dip coating, spray coating, slot die coating, flexographic printing, offset printing, screen printing, gravure printing, ink jet printing, and aerosol jet printing.

In certain embodiments, the hybrid conductive ink is deposited onto a substrate by ink jet printing. In other exemplary embodiments, aerosol jet printing is used for deposition. As used herein, "aerosol jet printing" refers to a process that involves atomization of the hybrid conductive ink, producing droplets on the order of one to two microns in diameter. The atomized droplets may be entrained in a gas stream and delivered to a print head. At the print head, an annular flow of gas may be introduced around the aerosol stream to focus the droplets into a tightly collimated beam. The combined gas streams may then exit the print head through a converging nozzle that compresses the aerosol stream to a small diameter, for example a diameter ranging from about 1 micron to about 10 microns. The jet exits the print head and is deposited on a substrate or other surface. The resulting patterns can have features ranging from about 5 microns to about 3000 microns wide, with layer thickness ranging from tens of nanometers to about 25 microns, such as from about 1 micron to about 20 microns.

The substrates described herein may be any suitable substrate including, but not limited to, silicon, a glass plate, a plastic film, fabric, or synthetic paper. For structurally flexible devices, plastic substrates such as polyester, polycarbonate, polyimide, polyethylene terephthalate (PET), polyethylene naphthalate (PEN), and the like may be used. The thickness of the substrate can be any suitable thickness, such as from about 10 micrometers to over 10 millimeters with an exemplary thickness being from about 50 micrometers to about 2 millimeters, such as for a flexible plastic substrate, and from about 0.4 millimeters to about 10 millimeters for a rigid substrate such as glass or silicon. In certain embodiments, the flexible plastic substrates is chosen from PET, PEN, and polycarbonate.

The heating for sintering can be for any suitable or desired time, such as from about 0.01 hours to about 10 hours, such as about 1 hour. The heating can be performed in air, in an inert atmosphere, for example under nitrogen or argon, or in a reducing atmosphere, for example under nitrogen containing from about 1 to about 20 percent by volume hydrogen. The heating can also be performed under normal atmospheric pressure or at a reduced pressure of, for example, about 1000 mbars to about 0.01 mbars.

Heating encompasses any technique that can impart sufficient energy to the heated material or substrate to anneal the silver nanoparticles and results in the melting and flow of the eutectic metal alloy nanoparticles. These techniques include thermal heating (for example, with a hot plate, an oven, or a burner), infra-red radiation, laser beam, flash light, microwave radiation, ultraviolet radiation, photonic sintering and combinations thereof. In certain embodiments, an oven is used for heating.

In some embodiments, after heating and cooling, for example to room temperature, an electrically conductive element is formed on the substrate that has a thickness ranging from about 0.1 to about 20 micrometers, such as from about 0.15 to about 10 or from about 0.1 to about 2 micrometers.

In some embodiments, the conductive element to be formed is an interconnect. As used herein, an "interconnect" is an interface between a conductive element (such as wires or copper foil traces or a conductive trace, such as a circuit trace, formed from, for example, a conventional nanosilver ink and/or the hybrid conductive ink as disclosed herein) and an electronic component such as a capacitor, resistor and/or semiconductor devices, such as diodes, transistors, and integrated circuits. In certain embodiments, a method of forming an interconnect comprises depositing, such as by aerosol jet printing or other methods as described herein, the hybrid conductive ink disclosed herein onto a conductive element positioned on a substrate.

The conductivity of the conductive elements, such as an electrically conductive trace or interconnect, which is produced by heating the deposited hybrid conductive ink of the present disclosure, may be more than about 10,000 Siemens/centimeter (S/cm), such as more than about 50,000 S/cm, more than about 80,000 S/cm, more than about 100,000 S/cm, more than about 125,000 S/cm, more than about 150,000 S/cm, or more than about 200,000 S/cm. In certain embodiments, the conductivity ranges from about 50,000 S/cm to about 200,000 S/cm, such as from about 80,000 S/cm to about 150,000 S/cm, or from about 100,000 S/cm to about 125,000 S/cm.

The resistivity of the conductive elements, such as an electrically conductive trace or interconnect, which is produced by heating the deposited hybrid conductive ink of the present disclosure may be less than about $1.0 \times 10^{-4}$ ohms-centimeter (ohm-cm), less than about $2.0 \times 10^{-5}$ ohms-cm, less than about $1.25 \times 10^{-5}$ ohms-cm, less than about $1.0 \times 10^{-5}$ ohms-cm, less than about $8.0 \times 10^{-6}$ ohms-cm, less than about $6.6 \times 10^{-6}$ ohms-cm, or less than about $5.0 \times 10^{-6}$ ohms-cm. In certain embodiments, the resistance ranges from about $2.0 \times 10^{-5}$ ohms-cm to about $5.0 \times 10^{-6}$ ohms-cm, such as from about $1.25 \times 10^{-5}$ ohms-cm to about $6.6 \times 10^{-6}$ ohms-cm, or from about $1.0 \times 10^{-5}$ ohms-cm to about $8.0 \times 10^{-6}$ ohms-cm.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

EXAMPLES

The following Examples are being submitted to further define various species of the present disclosure. These Examples are intended to be illustrative only and are not intended to limit the scope of the present disclosure. Parts and percentages are by weight unless otherwise indicated.

Example 1—Preparation of Field's Metal Nanoparticles with Different Organoamine Stabilizers A. Butylamine 300 mL of propylene glycol monomethyl ether acetate (PGMEA) solvent was added to a 500 mL beaker with a large magnetic bar. The beaker was put into a water bath on a hot plate. The PGMEA was heated to 65° C. while stirring the liquid. Next, 60 g (about 83 mL) of butylamine was added into the PGMEA. Then 20.8 g of Field's metal (32.5% Bi, 51% In, 16.5% Sn; melting point 62° C.) was added into the mixture, which was mixed until the Field's metal totally dissolved, i.e., at least two minutes. The mixture was then sonicated for 8-15 minutes using a Branson Digital Sonifier®, with a probe (Applitude) at 100% power. Ice was put into the water bath while sonicating to maintain a temperature less than 75° C. The highest temperature reached was about 72° C.

Hot water in the water bath was then decanted, and ice was put into the water bath; the 500 mL beaker was then put back on the ice. The mixture was allowed to cool down to room temperature and was left stirring overnight. The stirring was stopped when the mixture cooled down and was settled. The clear solvent on top of the mixture was then decanted, and a greyish suspension collected. About 500 mL of PGMEA was added to re-disperse the Field's metal nanoparticles in order to wash the residual amines. The suspension was centrifuged using a Baxter Scientific Products Cryofuge 6000 at a speed of 3000 rpm for 15 minutes. The clear solvent on top was decanted, and the washing process was repeated one more time. Once the clear PGMEA was decanted, the particles were left to air dry overnight. The final yield of the particles was over 95%.

Particle size distribution was analyzed using a Nanotrac® U2275E, and the results are shown below in Tables 1A and 1B. The average particle size when butylamine was used as the ligand was 142.6 nm (0.1426 μm), and the median diameter (D50) was 192 nm.

TABLE 1A

Particle Size Distribution for Nanoparticles with Butylamine

| Percentile | Size (nm) |
|---|---|
| 10% | 124.8 |
| 20% | 146.0 |
| 30% | 161.3 |
| 40% | 176.0 |
| 50% | 192.0 |
| 60% | 212.6 |
| 70% | 253.1 |
| 80% | 380 |
| 90% | 552 |
| 95% | 674 |

TABLE 1B

Particle Size Distribution for Nanoparticles with Butylamine

| Size (nm) | % Channel | % Pass |
|---|---|---|
| 6,540 | 0.0 | 100 |
| 5,500 | 0.0 | 100 |
| 4,620 | 0.58 | 100 |
| 3,890 | 0.47 | 99.42 |
| 3,270 | 0.0 | 98.95 |
| 2,750 | 0.0 | 98.95 |
| 2,312 | 0.0 | 98.95 |
| 1,944 | 0.0 | 98.95 |
| 1,635 | 0.0 | 98.95 |
| 1,375 | 0.0 | 98.95 |
| 1,156 | 0.0 | 98.95 |
| 972 | 0.79 | 98.95 |
| 818 | 2.74 | 98.16 |
| 687 | 4.10 | 95.42 |
| 578 | 4.91 | 91.32 |
| 486 | 4.51 | 86.41 |
| 409 | 4.38 | 81.90 |
| 344 | 3.79 | 77.52 |
| 289 | 5.38 | 73.73 |
| 243 | 11.83 | 68.35 |
| 204.4 | 19.27 | 56.52 |
| 171.9 | 18.19 | 37.25 |
| 144.5 | 10.24 | 19.06 |
| 121.5 | 5.25 | 8.82 |
| 102.2 | 2.95 | 3.57 |
| 85.9 | 0.62 | 0.62 |
| 72.3 | 0.0 | 0.0 |
| 60.8 | 0.0 | 0.0 |
| 51.1 | 0.0 | 0.0 |
| 43.0 | 0.0 | 0.0 |
| 36.1 | 0.0 | 0.0 |

B. Octylamine

Experiment 1 was repeated twice using octylamine in lieu of butylamine as the organoamine stabilizer. Particle size distribution was analyzed using a Nanotrac® U2275E for both runs, and the results are shown below in Tables 2A and 2B and Tables 3A and 3B. The average particle size when octylamine was used as the stabilizer was 223.2 nm and 107.5 nm, and the D50 was 339 nm and 191 nm, respectively.

TABLE 2A

Particle Size Distribution for Nanoparticles with Octylamine, Run 1

| Percentile | Size (nm) |
|---|---|
| 10% | 207.1 |
| 20% | 234.0 |
| 30% | 258.1 |
| 40% | 285.8 |
| 50% | 339 |
| 60% | 876 |
| 70% | 1,064 |
| 80% | 1,228 |
| 90% | 1,494 |
| 95% | 1,812 |

TABLE 2B

Particle Size Distribution for Nanoparticles with Octylamine, Run 1

| Size (nm) | % Channel | % Pass |
|---|---|---|
| 6,540 | 0.0 | 100 |
| 5,500 | 0.0 | 100 |
| 4,620 | 0.0 | 100 |
| 3,890 | 0.0 | 100 |
| 3,270 | 0.0 | 100 |
| 2,750 | 0.0 | 100 |
| 2,312 | 3.01 | 100 |
| 1,944 | 4.95 | 96.99 |
| 1,635 | 4.75 | 92.04 |
| 1,375 | 12.02 | 87.29 |
| 1,156 | 12.72 | 75.27 |
| 972 | 3.24 | 62.55 |
| 818 | 1.10 | 59.31 |
| 687 | 0.60 | 58.21 |
| 578 | 0.82 | 57.61 |
| 486 | 1.77 | 56.79 |
| 409 | 4.49 | 55.02 |
| 344 | 9.51 | 50.53 |
| 289 | 17.29 | 41.02 |
| 243 | 14.62 | 23.73 |
| 204.4 | 5.99 | 9.11 |
| 171.9 | 2.20 | 3.12 |
| 144.5 | 0.69 | 0.92 |
| 121.5 | 0.23 | 0.23 |
| 102.2 | 0.0 | 0.0 |
| 85.9 | 0.0 | 0.0 |
| 72.3 | 0.0 | 0.0 |
| 60.8 | 0.0 | 0.0 |
| 51.1 | 0.0 | 0.0 |
| 43.0 | 0.0 | 0.0 |
| 36.1 | 0.0 | 0.0 |

TABLE 3A

Particle Size Distribution for Nanoparticles with Octylamine, Run 2

| Percentile | Size (nm) |
|---|---|
| 10% | 97.9 |
| 20% | 112.1 |
| 30% | 125.4 |
| 40% | 143.2 |
| 50% | 191.3 |
| 60% | 278.8 |
| 70% | 350 |
| 80% | 452 |
| 90% | 1,024 |
| 95% | 1,615 |

TABLE 3B

Particle Size Distribution for Nanoparticles with Octylamine, Run 2

| Size (nm) | % Channel | % Pass |
|---|---|---|
| 6,540 | 0.0 | 100 |
| 5,500 | 0.0 | 100 |
| 4,620 | 0.0 | 100 |
| 3,890 | 0.0 | 100 |
| 3,270 | 0.0 | 100 |
| 2,750 | 0.0 | 100 |
| 2,312 | 1.28 | 100 |
| 1,944 | 3.46 | 98.72 |
| 1,635 | 3.17 | 95.26 |
| 1,375 | 1.50 | 92.09 |
| 1,156 | 0.87 | 90.59 |
| 972 | 1.48 | 89.72 |
| 818 | 2.06 | 88.24 |
| 687 | 1.89 | 86.18 |
| 578 | 2.73 | 84.29 |
| 486 | 4.51 | 81.56 |
| 409 | 7.91 | 77.05 |
| 344 | 7.80 | 69.14 |
| 289 | 5.61 | 61.34 |
| 243 | 4.25 | 55.73 |
| 204.4 | 4.12 | 51.48 |
| 171.9 | 6.74 | 47.36 |
| 144.5 | 13.36 | 40.62 |
| 121.5 | 14.69 | 27.26 |
| 102.2 | 7.68 | 12.57 |
| 85.9 | 3.14 | 4.89 |
| 72.3 | 1.75 | 1.75 |
| 60.8 | 0.0 | 0.0 |
| 51.1 | 0.0 | 0.0 |
| 43.0 | 0.0 | 0.0 |
| 36.1 | 0.0 | 0.0 |

C. Tetraethylenepentamine

Experiment 1 was repeated four times using tetraethylenepentamine in lieu of butylamine as the organoamine stabilizer. Particle size distribution was analyzed using a Nanotrac® U2275E, and the results are shown below in Tables 4A and 4B for one of the four trial runs. The average particle sizes when tetraethylenepentamine was used as the stabilizer was 141.4 nm, 148.6 nm, 146.9 nm, and 100.9 nm, for each of the four trial runs. The D50 for each of the four trial runs was 179 nm, 193 nm, 201 nm, and 158 nm, respectively.

TABLE 4A

Particle Size Distribution for Nanoparticles with Tetraethylenepentamine

| Percentile | Size (nm) |
|---|---|
| 10% | 121.3 |
| 20% | 135.6 |
| 30% | 153.3 |
| 40% | 165.8 |
| 50% | 179.4 |
| 60% | 196.2 |
| 70% | 221.9 |
| 80% | 260.1 |
| 90% | 307 |
| 95% | 342 |

TABLE 4B

Particle Size Distribution for Nanoparticles with Tetraethylenepentamine

| Size (nm) | % Channel | % Pass |
|---|---|---|
| 6,540 | 0.84 | 100 |
| 5,500 | 0.43 | 99.16 |
| 4,620 | 0.0 | 98.73 |
| 3,890 | 0.0 | 98.73 |
| 3,270 | 0.0 | 98.73 |
| 2,750 | 0.0 | 98.73 |
| 2,312 | 0.0 | 98.73 |
| 1,944 | 0.0 | 98.73 |
| 1,635 | 0.07 | 98.73 |
| 1,375 | 0.78 | 98.66 |
| 1,156 | 0.12 | 97.88 |
| 972 | 0.0 | 97.76 |
| 818 | 0.0 | 97.76 |
| 687 | 0.0 | 97.76 |
| 578 | 0.0 | 97.76 |
| 486 | 0.0 | 97.76 |
| 409 | 2.59 | 97.76 |
| 344 | 8.62 | 95.17 |
| 289 | 10.86 | 86.55 |
| 243 | 11.79 | 75.69 |
| 204.4 | 19.18 | 63.90 |
| 171.9 | 21.54 | 44.72 |
| 144.5 | 13.08 | 23.18 |
| 121.5 | 6.42 | 10.10 |
| 102.2 | 2.87 | 3.68 |
| 85.9 | 0.81 | 0.81 |
| 72.3 | 0.0 | 0.0 |
| 60.8 | 0.0 | 0.0 |
| 51.1 | 0.0 | 0.0 |
| 43.0 | 0.0 | 0.0 |
| 36.1 | 0.0 | 0.0 |

D. Methoxypropylamine

Experiment 1 was repeated using methoxypropylamine in lieu of butylamine as the organoamine stabilizer. Particle size distribution was analyzed using a Nanotrac® U2275E, and the results are shown below in Tables 5A and 5B. The average particle size when 3-methoxypropylamine was used as the stabilizer was 9 nm. The D50 was <1 nm.

TABLE 5A

Particle Size Distribution for Nanoparticles with Methoxypropylamine

| Percentile | Size (nm) |
|---|---|
| 10% | 0.82 |
| 20% | 0.84 |
| 30% | 0.87 |
| 40% | 0.89 |
| 50% | 0.91 |
| 60% | 0.93 |
| 70% | 0.96 |
| 80% | 0.99 |
| 90% | 1.04 |
| 95% | 1.07 |

TABLE 5B

Particle Size Distribution for Nanoparticles with Methoxypropylamine

| Size (nm) | % Channel | % Pass |
|---|---|---|
| 6,540 | 0.0 | 100 |
| 5,500 | 0.0 | 100 |
| 4,620 | 0.0 | 100 |
| 3,890 | 0.0 | 100 |
| 3,270 | 0.0 | 100 |
| 2,750 | 0.0 | 100 |
| 2,312 | 0.0 | 100 |
| 1,944 | 0.0 | 100 |
| 1,635 | 0.0 | 100 |
| 1,375 | 0.0 | 100 |
| 1,156 | 0.0 | 100 |
| 972 | 0.0 | 100 |
| 818 | 0.0 | 100 |
| 687 | 0.0 | 100 |
| 578 | 0.0 | 100 |
| 486 | 0.0 | 100 |
| 409 | 0.0 | 100 |
| 344 | 0.0 | 100 |
| 289 | 0.0 | 100 |
| 243 | 0.0 | 100 |
| 204.4 | 0.0 | 100 |
| 171.9 | 0.0 | 100 |
| 144.5 | 0.0 | 100 |
| 121.5 | 0.0 | 100 |
| 102.2 | 0.0 | 100 |
| 85.9 | 0.0 | 100 |
| 72.3 | 0.0 | 100 |
| 60.8 | 0.0 | 100 |
| 51.1 | 0.0 | 100 |
| 43.0 | 0.0 | 100 |
| 36.1 | 0.0 | 100 |
| 30.4 | 0.0 | 100 |
| 25.55 | 0.0 | 100 |
| 21.48 | 0.0 | 100 |
| 18.06 | 0.0 | 100 |
| 15.19 | 0.0 | 100 |
| 12.77 | 0.0 | 100 |
| 10.74 | 0.0 | 100 |
| 9.03 | 0.0 | 100 |
| 7.60 | 0.0 | 100 |
| 6.39 | 0.0 | 100 |
| 5.37 | 0.0 | 100 |
| 4.52 | 0.0 | 100 |
| 3.80 | 0.0 | 100 |
| 3.19 | 0.0 | 100 |
| 2.69 | 0.0 | 100 |
| 2.26 | 0.0 | 100 |
| 1.90 | 0.0 | 100 |
| 1.60 | 0.0 | 100 |
| 1.34 | 0.0 | 100 |
| 1.13 | 32.06 | 100 |
| 0.95 | 67.94 | 67.94 |

E. Other Ligands

Experiment 1 was repeated using each of 2,2-(ethylenedioxy)diethylamine and pentaethylenehexamine as the organoamine stabilizers. Particle size distribution was analyzed using a Nanotrac® U2275E. For 2,2-(ethylenedioxy)diethylamine, the average particle size was 0.9 nm, with a D50 of 1 nm. For pentaethylenehexamine, the average particle size was 2.9 nm, with a D50 of 212 nm.

Comparative Example 1—Preparation of Field's Metal Particles in Water 300 mL of deionized water was added to a 500 mL beaker with a large magnetic bar. The beaker was put into a water bath on a hot plate. The water was heated to 65° C. while stirring. Next, 60 g (about 83 mL) of butylamine was added into the water. Then 20.8 g of Field's metal (32.5% Bi, 51% In, 16.5% Sn; melting point 62° C.) was added into the mixture, which was mixed until the Field's metal totally dissolve, i.e., at least two minutes. The mixture was then sonicated for 8-15 minutes using Branson Digital Sonifier®, with a probe (Applitude) at 100% power. Ice was put into the water bath while sonicating to maintain a temperature less than 75° C.

Hot water in the water bath was then decanted and ice was put into the water bath; the 500 mL beaker was then put back on the ice. The mixture was allowed to cool down to room temperature and was left stirring overnight. The stirring was stopped when the mixture cooled down and was settled. The clear solvent on top of the mixture was then decanted, and the greyish suspension collected. Water was added to redisperse and wash the Field's metal particles from excess amine. The mixture was then centrifuged at a rpm of 3000 for 15 minutes. The clear water on top was decanted after centrifugation. This washing step was repeated once. Finally, after decanting the water, the Field's metal particles were left in the beaker to air dry overnight. The final yield of the particles was greater than 95%.

Particle size distribution was analyzed using a Nanotrac® U2275E. The measurements indicated that 95% of the resultant eutectic metal alloy particles were between 1.3 μm and 5.0 μm. The median diameter (D50) of the eutectic metal alloy particles was 4.17 μm.

Example 2—Preparation of Conductive Ink with Field's Metal Nanoparticles and Organoamine Stabilizers A 50% solid content ink was prepared as follows: 10.5 g glass beads (d=4 mm) were added to a bottle, in addition to 16.7 g of Field's metal nanoparticles, 5.6 g of ethylcyclohexane, and 11.1 g phenylcyclohexane (total solvent=16.7 g). A PTFE cap sealed the bottle. The formulation was rolled for three days on a movil rod roller.

Example 3—Preparation of Conductive Ink with Field's Metal Nanoparticles Organoamine Stabilizers and Silver Nanoparticles 12 g of a silver nanoparticle ink was added to a bottle, followed by 1.58 g Field's Metal nanoparticles. Argon air was blown into the jar for around 15 to 20 seconds, and then the bottle was quickly sealed. The ink formulation was rolled for 2 days at about 65 rpm. The ink was printed using an Optomec Aerosol Jet system, and the conductivity of the printed lines was measured to be about $1.6 \times 10^5$ S/cm.

What is claimed is:

1. A composition for conductive inks consisting of:
   a plurality of eutectic metal alloy nanoparticles having an average particle size ranging from about 0.5 nanometers to less than about 5000 nanometers;
   at least one organoamine stabilizer; and
   at least one organic polar solvent.

2. The composition for conductive inks of claim 1, wherein the eutectic metal alloy nanoparticles comprise Field's metal alloy.

3. The composition for conductive inks of claim 1, wherein the at least one organic polar solvent is chosen from the group consisting of propylene glycol methyl ether acetate, di(propylene glycol) methyl ether acetate, (propylene glycol) methyl ether, di(propylene glycol) methyl ether, methyl isobutyl ketone, diisobutyl ketone, and 1-phenoxy-2-propanol.

4. The composition for conductive inks of claim 1, wherein the eutectic metal alloy nanoparticles have an average particle size ranging from about 50 nanometers to about 800 nanometers.

5. The composition for conductive inks of claim 1, wherein the eutectic metal alloy nanoparticles have an average particle size ranging from about 60 nanometers to about 250 nanometers.

6. The composition for conductive inks of claim 1, wherein the at least one organoamine stabilizer is chosen from the group consisting of propylamine, butylamine, pentylamine, hexylamine, heptylamine, octylamine, 3-methoxypropylamine, pentaethylenehexamine, 2,2-(ethylenedioxy)diethylamine, tetraethylenepentamine, triethylenetetramine, diethylenetriamine, 1,11-diamino-3,6,9-trioxaundecane, 2,2'-(ethylenedioxy)bis(ethylamine), and 2-(2-aminoethoxy)ethylamine.

* * * * *